(12) United States Patent
Triplett

(10) Patent No.: X8209
(45) Date of Patent: May 19, 1834

(54) PRESS, COTTON & HAY

(76) Inventor: Robert Triplett

Robert Triplett. County of Daviess. Kentucky.

Letters Patent.

The schedule referred to in these Letters Patent and making part of the same
containing a description in the words of the said Robert Triplett [illegible] of the
improvement in the machine for pressing Hay, Cotton &c.

To all to whom these presents shall come.

Be it known that I Robert Triplett of the County of Daviess and State
of Kentucky. have invented a new and useful improvement in the pressing
machine, for pressing Cotton, Hay, and other Articles and that the following
is a full and exact description of the construction and operation of the machine
as invented by me, and called the horizontal Press The object of this invention is to do the pressing horizontally instead of perpendicu-
larly, as is usual, and to press at both ends of the screw instead of at one, thereby
accomplishing double the usual work in the same time. This is accomplished
in three different modes. First by a cast iron wheel with a screw nut or a
female screw in the hub thereof and a male screw passing through the same;
the hub revolving in two plummer blocks, one on each side of the spokes, fixed
into head blocks, covering the end of the hub completely, except an orifice suf-
ficient for the screw to pass through. At the ends of the hub as well as on the
circumference only so much is allowed to bear (the balance being hollowed out)
as may be requisite for strength. This is to avoid friction. The wheel being cog-
ged and geared into wheels driven by steam, water or horse power, will revolve
with a velocity and strength according to the gearing and power applied to it.
The gearing it is useless to particularize, as every mill wright understands it.
But the simplest plan is by a perpendicular shaft, resting with its lower end
upon a bridge tree across the pressing box, the upper end passing through a floor
above the pressing box, and confined by two timbers (part of the floor) with a
half round cut out of each making about a neck cut into said shaft. Through
the upper end of the shaft a hole is cut of sufficient size for a lever of any given length to bear the power to be applied to it: on the said shaft below, is a wheel or a trun-
-dle head to work into the nut wheel. The upright shaft being put in motion by
horses at the end of the lever, turns the vertical nut wheel, and the screw being
fastened at each end to followers, so as to prevent its revolving, it must pass to
and fro, as the vertical wheel revolves, and so the pressing in boxes prepared for the
purpose, at each end of the screw, see the drawing —

The next is upon the same plan with this difference only. The screw instead of
working into the wheel, forms the axle of the wheel & is fixed firm into the hub.
For a small space on each side of the hub, there are no threads but the shaft of
the screw, is left smooth, and these smooth spaces revolve in plummer blocks on
each side of the hub as before described. on each end of the screw is a nut in
a strong moveable timber of the same size of the pressing followers, which works in
the press box. From this moveable timber to said followers are two arms of suffi-
-cient size to bear any pressure which may be required. these arms extend
from said moveable timber when at the hub of the wheel, to said followers
beyond the end of the screw, say ten feet. As the screw revolves, it
draws this frame towards the wheel, on one side and drives it from it on
the other, and alternately presses at either end, see the drawing —

The first of these plans requires but half the length of screw of the latter
and not much over half the length of press box. It also dispenses with the
timber in which the nuts are, as well as the arms. — but it has more friction by
revolving on the hub than the latter which revolves on a small axle.
The latter advantage however I deem unequal to its disadvantages, and therefore
prefer the first plan. — The third plan is as follows. The screw is
to be very large and may be made of wood. The threads work into cogs in a
timber below, called the "slider". This slider is of substance sufficient to bear
any pressure which may be put on it: wide enough to admit of cogs two feet
across to fit the space between the threads of the screw, and runs in a chamber
of the length of the screw or any desired length made just to fit it. It is
hollowed a little at the sides and bottom to avoid friction the outer edges
only touching. The bottom of the chamber is of a thickness equal to the
space between the top of the slider and the top of the press box, thereby hol-
ding it (the slider) exactly in the centre of the box. The top surface of the slider is hollowed to fit the circumference of the screw, so are the tops of the cogs. and
the cogs are put into the slider at the same angle as the threads of the screw,
so as to fit well and closely into the spaces. A gudgeon at each end of the screw
shaft (which should be about Eight feet long) fits into a head block mortised
into the press box & tenoned into posts on the outside. all in the strongest
possible manner, at one end of said shaft are bevelled cogs which work
into bevelled cogs in an upright shaft, the gudgeon from which fits into the
same head block, into which the gudgeon from the screw shaft is inserted.
This upright shaft passes through the floor above &, is worked as the
others are — see the drawing for a more clear comprehension of this plan.
In this plan the friction I consider less than in either of the other two, as
the pressing power is against the end of a gudgeon instead of being against
the end of the surface of the hub. The friction against the cogs is
not greater than that of the screw in the nut, for two feet of cog sur-
face, in a slider eight feet in length, is less than the surface for the
whole circumference two feet in length, and yet eight feet of cog sur-
-face (being about eleven cogs of two feet each) will give any desired
strength, the cogs being three inches thick, and showing only two inches
above the slider, but when the size of the iron screw, is compared with
the wooden, I am not prepared to say that the same power on the
iron would not do more than on the wooden screw, in the score of ex-
pense the wooden has the advantage, it may be made and the whole
machinery belonging to it in any section of country by an ordinary engineering
mechanic, the iron screw must be at least six inches in diameter and
twelve feet long. If of wrought iron (and I am not sure that cast iron will
answer) it would be very costly. These considerations induce me to adopt
for my own use the wooden screw, to a press which I am now erecting.
I get the shaft upon which the thread is cut three feet in diameter, cut
the thread four inches wide and two deep, the space three inches, one
revolution thereof drives the slider forward seven inches, the space is less
than the thread because, the face of a cog presented to a wooden thread,
is stronger than the thread. The press box should be about thirty seven
feet long, eight feet in the centre for the screw, three feet for the two head blocks, each being a foot and a half thick. Two feet for the followers each
being a foot thick & two feet for two false followers, the two latter to be between
the bale & the followers, with two large grooves in them on the side next to
the followers, for cramps (like square staples) to take hold of the false followers,
by means of screw bolts, passed down through those grooves, the arms reach
-ing back and jointed over the end of the press. When the bale is pressed
these screw bolts are passed down, taps put on below and wedges driven
between the cramps and the press, to tighten the false followers, or if the expense
be not an objection, the sides of the press can be extended as represented in the
drawing —— A false follower with a tongue at each end put into grooves into
said sides, the cramp embracing it and extending its arms into the press.
A screw through this follower with the head inward, the screw pointing
outwards and passing through an end piece and through the hub, of a
wheel on the outside with a screw nut therein, now when the cramps
are fast a turn of this wheel tightens the false follower, in other words
presses the bale so as to relieve the slider which may now return to press
upon the other side. The spaces in the pressing chamber for receiving
the article to be pressed should be ten feet in length, together twenty feet
then the two end pieces of the press a foot each makes thirty seven feet
this completes the length of the press proper. —— But if the appendages
for the cramps are added then there must be two feet for the cramp
followers. ten feet for two spaces of five feet each, and two feet for two
end pieces of a foot each — making an addition of fourteen feet, in all
making the length of the press fifty one feet to the wheel and about four feet
more for boxing to enclose the hub of the wheel, so as to hold it to its place.
If the wheel be small it may revolve within the sides of the box extended
but if desired larger the boxing must be widened. Another advantage
in this wheel and the cramps is that by passing a chain round the
wheel and over pulleys, then crossing the chain and passing it round the
upright or driving shaft, you obtain the power of the horse to work the iron
screw, as the wooden slider retires, and by this means the pressure
on the bale will be many fold greater than the first pressing, it is only
necessary to have the iron screw and cramps strong enough, as well as the pulleys and chain, to press the bale so hard as not to require repressure
for shipment. The pressing box is placed high enough from the ground
floor to allow the bale when pressed to pass out below, also high enough to allow
the door below to open without touching the ground, The lower side or
bottom of the pressing chamber, is floored of course except so much as may
be necessary for the bale to pass out at, This space is filled as is the top by
doors, which are hung with hinges, which might be made strong enough as
might the doors & a button on the opposite side to withstand the pressure
but to guard against all doubt on that score, I shall construct that
which I am erecting as I have had the model made, with strops and
bars. The advantage of this press over the usual one is, that it presses
at both ends. that by being horizontal while the operation of pressing
is proceeding on one side the other being empty can be filled and pre-
pared to receive the pressure so soon as it is completed on the op
posite side, even the delay for sewing and roping the bale is avoided
by the aid of the cramps. which are fixed in a few minutes, see the
drawing of the cramps as clasping the follower. detached from the press,
& see them also in the press, — see a top view of the press in the drawing
with the doors open on one side & closed on the other, see the upright
shaft working into the screw shaft, & the screw working into the slider, as
detached from the press box. see at the end of the slider, the follower
with holes through it, for screwing it to the slider. see the false follower,
ready to be laid loose against the follower with grooves for the cramp
bolts on one side & for the baling rope on the other, see the correspon
ding grooves for the baling rope in the press chamber; then see the draw
-ing of the whole machine together and that together with this description
will give a complete idea of the whole machine.—

I claim as my invention, the horizontal pressing box and
cogged slider therein, whether moved by a screw or other machinery,
I claim also as my invention the application of the screw, to the said
cogged slider.— I claim also as my invention, the horizontal pres-
sing box. with the screw passing through the hub of a wheel, which
by revolving different ways causes the screw when attached to follower at either end to press first at one end and then at the other.

I claim as my invention, the screw laid horizontally in a pressing box, with a wheel in the centre thereof revolving upon the screw shaft as an axle, the same being fast in the hub of the wheel; and a small smooth surface of the screw shaft on each side of said hub forming the axle -- nuts being fastened on each end of said screw to which is attached the pressing power as hereinbefore described:

All the foregoing I claim as various modifications and appli-cations of the same principle invented by me ——

Witnesses
S. V. Rogers
H. Blair

Robert Triplett.

Exd
[illegible]

Patented 19. May 1824.